United States Patent
Tang (10) Patent No.: US 11,102,266 B2
(45) Date of Patent: Aug. 24, 2021

(54) METHOD AND DEVICE FOR DETERMINING CODEC MODE SET FOR SERVICE COMMUNICATION

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 441 days.

(21) Appl. No.: 15/999,277

(22) PCT Filed: Apr. 12, 2016

(86) PCT No.: PCT/CN2016/079095
§ 371 (c)(1),
(2) Date: Aug. 17, 2018

(87) PCT Pub. No.: WO2017/177382
PCT Pub. Date: Oct. 19, 2017

(65) Prior Publication Data
US 2020/0336530 A1   Oct. 22, 2020

(51) Int. Cl.
H04L 29/06 (2006.01)
H04W 28/18 (2009.01)
H04W 24/08 (2009.01)

(52) U.S. Cl.
CPC ........ H04L 65/607 (2013.01); H04L 65/1069 (2013.01); H04L 65/608 (2013.01);
(Continued)

(58) Field of Classification Search
CPC . H04L 65/607; H04L 65/1069; H04L 65/609; H04L 65/80; H04L 65/1006; H04W 24/08; H04W 28/18
See application file for complete search history.

(56) References Cited

U.S. PATENT DOCUMENTS

2004/0047437 A1   3/2004 Hamiti
2005/0249196 A1*  11/2005 Ansari ................ H04L 65/1033
                                                              370/352
(Continued)

FOREIGN PATENT DOCUMENTS

CN    1856147 A    11/2006
CN    1921478 A    2/2007
(Continued)

OTHER PUBLICATIONS

Second Office Action of the Chinese application No. 201680084117.X, dated Jun. 12, 2020.
(Continued)

Primary Examiner — Kent Krueger
(74) Attorney, Agent, or Firm — Ladas & Parry LLP (57) ABSTRACT

The present invention relates to a communication method and device. The communication method comprises: obtaining information related to a current network state; determining an appropriate codec mode set according to the information related to the current network state and information related to a service type; and carrying out service communication by using the appropriate codec mode set. According to the communication method, since the current network state is considered during determining of the codec mode set, the overall network performance is improved.

18 Claims, 8 Drawing Sheets

(52) U.S. Cl.
CPC ............. *H04L 65/80* (2013.01); *H04W 24/08* (2013.01); *H04W 28/18* (2013.01); *H04L 65/1006* (2013.01)

(56) References Cited

U.S. PATENT DOCUMENTS

| | | | |
|---|---|---|---|
| 2007/0043558 | A1 | 2/2007 | Schwarz |
| 2007/0165610 | A1* | 7/2007 | Tseng ............... H04L 29/06027 370/356 |
| 2007/0297424 | A1 | 12/2007 | Xia |
| 2010/0312832 | A1* | 12/2010 | Allen .................... H04L 65/403 709/204 |
| 2010/0312897 | A1* | 12/2010 | Allen ................. H04L 12/1818 709/227 |
| 2011/0170410 | A1 | 7/2011 | Zhao |
| 2012/0106451 | A1 | 5/2012 | Enstroem |
| 2013/0230057 | A1 | 9/2013 | Hori |
| 2014/0219088 | A1* | 8/2014 | Oyman ............... H04L 65/1083 370/231 |
| 2015/0319609 | A1* | 11/2015 | Asterjadhi .............. H04W 8/22 370/328 |
| 2016/0100230 | A1* | 4/2016 | Ma ................... H04N 21/44209 725/109 |
| 2016/0301777 | A1 | 10/2016 | Hori et al. |
| 2017/0070543 | A1* | 3/2017 | Balasubramanian ........................ H04W 28/0268 |
| 2017/0303159 | A1* | 10/2017 | Ma .................... H04W 28/0289 |
| 2018/0279321 | A1* | 9/2018 | Hori ...................... H04W 28/02 |

FOREIGN PATENT DOCUMENTS

| | | |
|---|---|---|
| CN | 101047466 A | 10/2007 |
| CN | 101292560 A | 10/2008 |
| CN | 101399630 A | 4/2009 |
| CN | 101523845 A | 9/2009 |
| CN | 101925010 A | 12/2010 |
| CN | 102474552 A | 5/2012 |
| CN | 102546085 A | 7/2012 |
| CN | 106129641 A | 11/2016 |
| EP | 2640052 A1 | 9/2013 |
| EP | 2262146 A3 | 10/2015 |
| JP | 2003264490 A | 9/2003 |
| JP | 2010288277 A | 12/2010 |
| JP | 2013516931 A | 5/2013 |
| KR | 101476138 B1 | 12/2014 |
| WO | 2011105407 A1 | 9/2011 |
| WO | 2012077701 A1 | 6/2012 |
| WO | 2012166268 A1 | 12/2012 |

OTHER PUBLICATIONS

First Office Action of the European application No. 16898201.5, dated Jun. 16, 2020.
First Office Action of the Indian application No. 201817041874, dated Jul. 6, 2020.
First Office Action of the Israei application No. 262190, dated Jun. 16. 2020.
Second Office Action of the Japanese application No. 2018-551840, dated Sep. 1, 2020.
First Office Action of the Taiwanese application No. 100111280, dated Aug. 7, 2020.
Second Office Action in Chinese application No. 201810054802.9, dated Jan. 2, 2020.
International Search Report in international application No. PCT/CN2016/079095, dated Jan. 23, 2017.
Written Opinion of the International Search Authority in international application No. PCT/CN2016/079095, dated Jan. 23, 2017.
Supplementary European Search Report in the European application No. 18898201.5, dated Jan. 28, 2019.
English Translation of the Written Opinion of the International Search Authority in the international application No. PCT/CN2016/079095, dated Jan. 23, 2017.
First Office Action in Japanese application No. 2018-551840, dated Jan. 7, 2020.
First Office Action in Chinese application No. 201680084117.X, dated Mar. 11, 2020.
Decision of re-examination of the Taiwanese application No. 106111280, dated Nov. 30, 2020.
3GPP TS 26.071 V13.0.0 (Dec. 2015), 3rd Generation Partnership Project; Technical Specification Group Services and System Aspects; Mandatory speech CODEC speech processing functions; AMR speech CODEC; General description (Release 13).
3GPP TS 26.103 V13.0.0 (Dec. 2015), 3rd Generation Partnership Project; Technical Specification Group Services and System Aspects: Speech codec list for GSM and UMTS (Release 13).

* cited by examiner

METHOD AND DEVICE FOR DETERMINING CODEC MODE SET FOR SERVICE COMMUNICATION

RELATED APPLICATION

This application is an application under 35 U.S.C. 371 of international Application No. PCT/CN2016/079095 filed on 12 Apr. 2016, the entire contents of which are incorporated herein by reference.

TECHNICAL FIELD

The present disclosure relates to a wireless communication system, and particularly to a method and device for determining a codec set for service communication in a wireless communication system.

BACKGROUND

Voice Over Internet Protocol (VoIP) refers to digitalization of an analogue sound signal for real-time transmission on an Internet Protocol (IP) data network in a data packet form. An IP Multimedia Subsystem (IMS) which supports various kinds of access and rich multimedia services has become a core network standard architecture in the whole IP era. Voice over Long Term Evolution (VoLTE) bears a voice service based on an IMS network and may not only provide high-rate data services but also provide high-quality audio and video calls.

In a related art, a codec mode set of VoLTE is determined by means of a control protocol (Session Initiation Protocol (SIP) and Realtime Transport Protocol (RTP)/Realtime Transport Control Protocol (RTCP)) of an application layer of User Equipment (UE). For example, sessions of one or more participants may be created, modified and released by means of the SIP; and the RTP and the RTCP may be matched to optimize transmission efficiency with effective feedback and lowest overhead. The codec mode set is a set consisting of parameters such as a voice codec scheme, a voice data transmission rate and the like. For example, for an Adaptive Multi Rate (AMR) voice codec scheme, the voice data transmission rate may be 4.75 Kbps, 5.15 kbps, 5.9 kbps, 6.7 kbps, 7.4 kbps, 7.95 kbps, 10.2 kbps and 12.2 kbps. Therefore, for the AMR voice codec scheme, the control protocol of the application layer may select a proper codec mode set from the eight codec mode sets to initiate a VoLTE service request.

Figure 1:
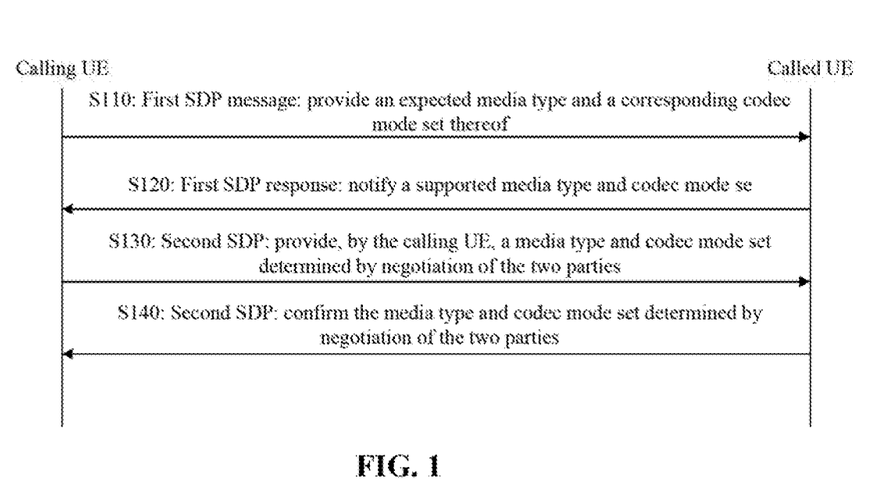
FIG. 1 illustrates a conventional process of creating a session by adopting SIP signaling.

FIG. 1 illustrates a process of creating a session by adopting SIP signaling. In S110, calling UE provides an expected media type (i.e., an audio service or a video service) and a corresponding codec mode set thereof by means of a first Session Description Protocol (SDP) message; called UE notifies its supported media type and codec mode set by means of a first SDP response (S120); in S130, the calling UE provides a media type and codec mode set determined by negotiation of the two parties by means of a second SDP; and the called UE confirms the media type and codec mode set determined by negotiation of the two parties by means of a second SDP (S140). In a call process, a voice data transmission rate is regulated through an RTP.

Along with development of a mobile communication technology, a user makes a higher requirement on performance of a mobile communication network.

SUMMARY

The disclosure provides a method and device for determining a codec set for service communication in a wireless communication system, which may improve performance of a mobile communication network.

According to an aspect of the disclosure, a communication method is provided, which may include the following actions. Information about a current state of a network is obtained. A proper codec mode set is determined based on the information about the current stale of the network and information about a type of a service. Service communication is performed by means of tire proper codec mode set.

According to an aspect of the disclosure, a communication device is provided, which may include: a unit configured to obtain information about a current state of a network; a unit configured to determine a proper codec mode set based on the information about the current state of the network and information about a type of a service; and a unit configured to perform service communication by means of the proper codec mode set.

According to an aspect of the disclosure, a communication device is provided, which may include a memory and a processor. The processor may execute an instruction stored in the memory to enable the communication device to execute the method recorded in each embodiment of the disclosure.

According to an aspect of the disclosure, a computer program product is provided, which may include a computer-readable medium with an instruction set stored thereon, wherein instructions may be executed by one or more processors, and the instruction set may be executed to enable a machine to execute the method recorded in each embodiment of the disclosure.

According to the communication method of the disclosure, the current state, for example, network traffic, of the network is considered when the codec mode set is determined, so that the determined codec mode set configured to send a VoLTE service request may be matched with a current condition of the network, and correspondingly, the number of limes for which an application layer regulates the codec mode set (for example, a voice data transmission rate) may also be reduced. Multiple network nodes and relatively more used signaling may be involved in adaptive regulation of the application layer, so that reduction in the number of times for which the application layer regulates the codec mode set may improve the whole network performance.

BRIEF DESCRIPTION OF DRAWINGS

The abovememioned and other features, characteristics, advantages and benefits of the disclosure will become more apparent through the following detailed descriptions made in combination with the drawings.

In all of the drawings, the same drawing reference signs represent similar or corresponding characteristics or functions.

DETAILED DESCRIPTION

Figure 2:
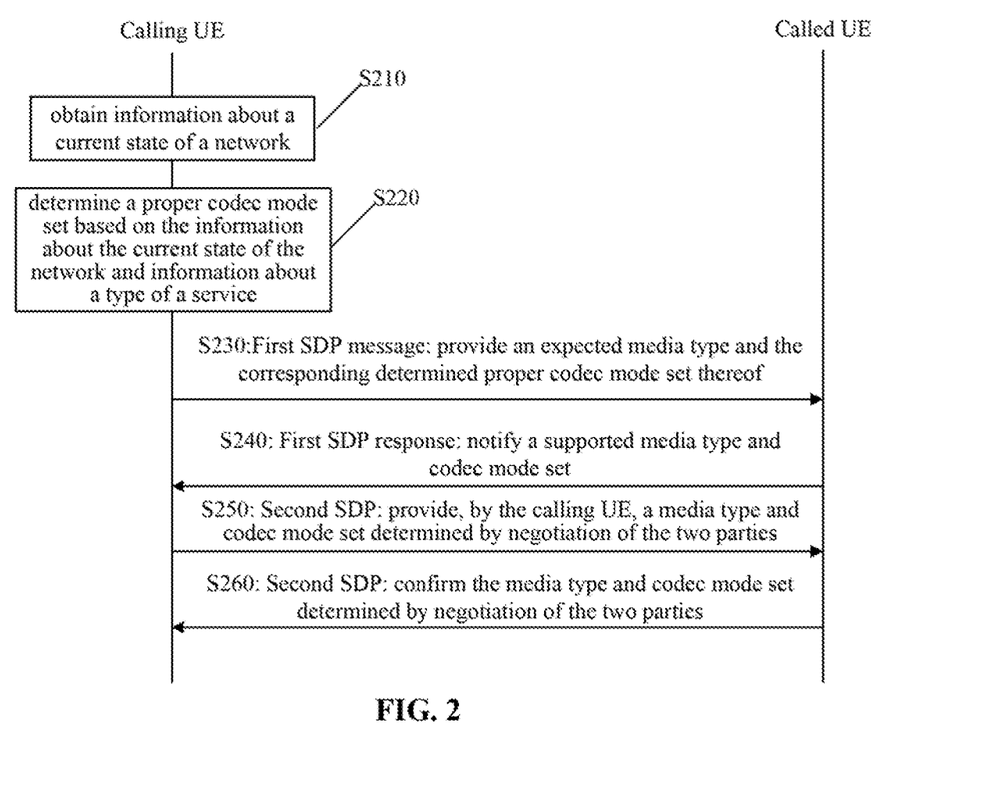
FIG. 2 illustrates a schematic diagram of a session creation process according to an embodiment of the disclosure.

FIG. 2 is a schematic diagram of a session creation process according to an embodiment of the disclosure. As illustrated in FIG. 2, in S210, an access layer of calling UE obtains information about a current slate of a network. In an embodiment, the current state of the network includes network traffic. Excessively high network traffic for example, an excessively large number of groups, may cause network congestion. The calling UE may receive information about current network traffic from the network through a broadcast channel. In another embodiment, the current state of the network includes channel performance. In a Wideband Code Division Multiple Access (WCDMA) network, channel performance may be indicated by a parameter such as Received Signal Code Power (RSCP). In an LTE network, channel performance may be indicated by a parameter such as Reference Signal Receiving Power (RSRP) or a Received Signal Strength Indicator (RSSI).

The information about the current state of the network is transmitted to an application layer of the calling UE through the access layer of the calling UE. When the calling UE is intended to initiate a service request, the application layer of the calling UE determines a proper codec mode set based on the information about the current state of the network and information about a type of a service (S220). The information about the type of the service includes information configured to indicate the type of the service. The type of the service may not only be a type of a service involved in a session to be created but also be a type of a service supported by application software, configured to create the session, of the calling UE. The type of the service includes a voice, data and a video. For different types of service, corresponding media types may be adopted to create the session. For example, for a voice service and a video service, respectively corresponding channel bandwidths may be allocated.

For the voice service, the codec mode set includes a voice codec scheme, a voice data transmission rate, frame aggregation and information about redundancy. The voice codec scheme further includes: AMR, Adaptive Multi-rate-Wideband (AMR-WB) and Enhanced Voice Service (EVS). For each voice codec scheme, different voice data transmission rates may be configured. For example, for the AMR voice codec scheme, the voice data transmission rate may be 4.75 kbps, 5.15 kbps, 5.9 kbps, 6.7 kbps, 7.4 kbps, 7.95 kbps, 10.2 kbps and 12.2 kbps. The information about redundancy includes a redundancy class, a redundancy offset and the like. For the EVS voice codec scheme, the codec mode set further includes a voice bandwidth, information about partial redundancy and information about switching between an EVS main mode and an AMR-WB Input/Output (IO) mode. For a specific voice service to be transmitted, a codec mode set is formed by a set consisting of multiple specifically adopted parameters such as a voice codec scheme, a voice data transmission rate, frame aggregation and information about redundancy. For the video service, the codec mode set includes a video data transmission rate, a bandwidth and an image size. In an embodiment, for a voice service to be transmitted, the calling UE may determine a codec mode set suitable for transmitting the voice service according to detected current channel performance. For example, if the current channel performance is high, the voice codec scheme AMR and the voice data transmission rate 12.2 kbps may be selected from the determined codec mode set. In another embodiment, for a specific video service (for example, a video image) to be transmitted, if the detected current channel performance is high, a relatively high video data transmission rate may be selected from the determined proper codec mode set to transmit the video image.

The calling UE initiates the service request to called UE by means of a first SDP message and provides an expected media type and the determined proper codec mode set (S230). The called UE notifies its supported media type and codec mode set by means of an SDP response (S240). In S250, the calling UE provides a media type and codec mode set determined by negotiation of the two parties by means of a second SDP. The called UE confirms the media type and codec mode set determined by negotiation of the two parties by means of a second SDP (S260). If the called UE confirms the proper codec mode set through a negotiation process, the calling UE and the called UE may perform service communication, for example, transmitting the video image in the abovementioned embodiment, by means of the proper codec mode set.

Besides consideration of the current state of the network and the type of the service, if the calling UE has user access classes, a current user access class of the calling UE may be read and the proper codec mode set is determined according to the current user access class. In an embodiment, the user access class includes an ordinary user. Public Land Mobile Network (PLMN) staff, a PLMN administrator, application by a security department, a public service division (for example, water and gas), an emergency service and the like. In addition, if live calling UE has user priorities, a current user priority of the calling UE may also be read and the proper codec mode set is determined according to live current user priority. In an embodiment, high, medium and low priorities may be set for a China Mobile Go Tone VIP user, a Go Tone user and a non-Go Tone user respectively.

Figure 3:
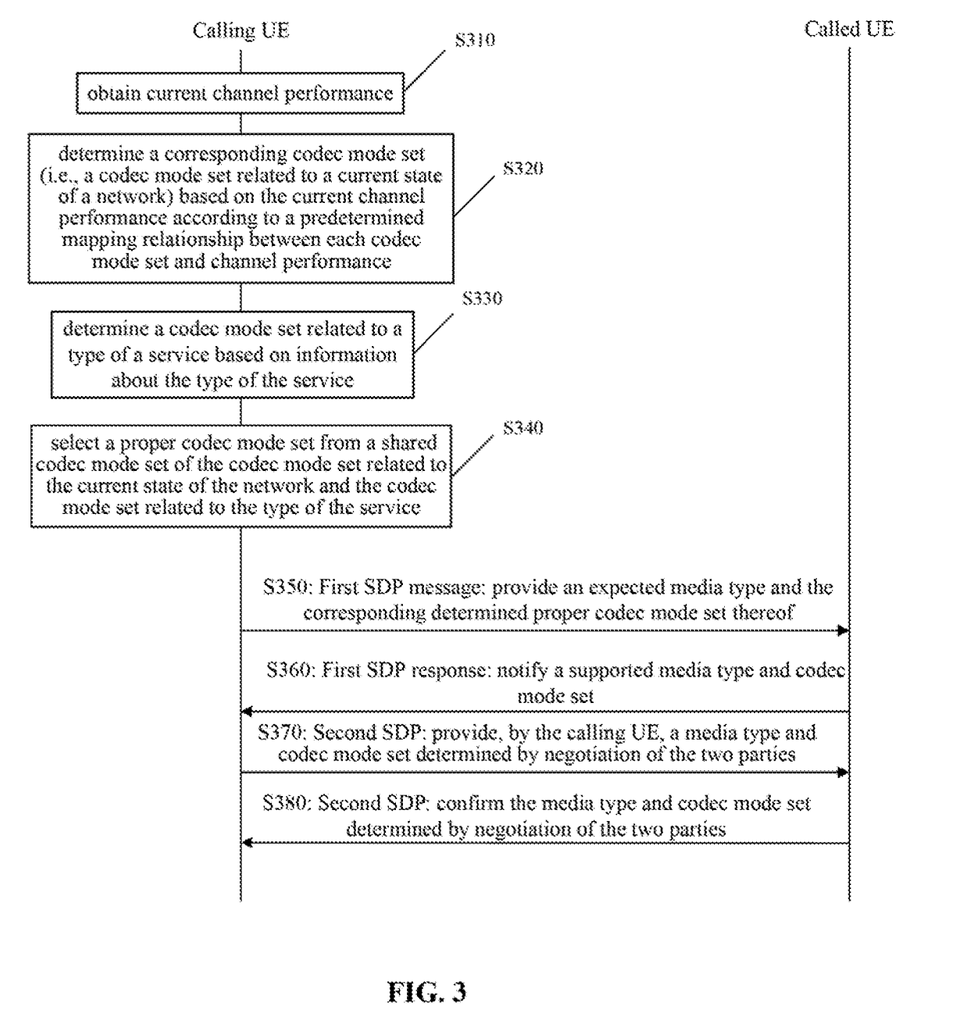
FIG. 3 illustrates a schematic diagram of a session creation process according to another embodiment of the disclosure.

FIG. 3 illustrates a schematic diagram of a session creation process according to another embodiment of the disclosure. As illustrated in FIG. 3, in S310, the access layer of the calling UE obtains the current channel performance by detection (for example, channel estimation).

In S320, the calling UE determines the corresponding codec mode set (i.e., the codec mode related to the current state of the network) based on die current channel performance according to a predetermined mapping relationship between codec mode sets and channel performances. The codec mode set related to the current state of the network may include multiple codec mode sets. For example, for the AMR voice codec scheme, the voice data transmission rate may be 4.75 kbps, 5.15 kbps, 5.9 kbps and 6.7 kbps, i.e., four codec mode sets. S320 may be executed by an access-layer protocol of the calling UE.

The predetermined mapping relationship (for example, a mapping table) between codec mode sets and channel performances may be pre-stored in the calling UE. In the mapping table for the codec mode sets and the channel performance, a codec mode set may be mapped with a channel performance range and may also be mapped with a channel performance lower limit. A corresponding highest codec mode set may be set for a channel performance range, or a corresponding highest codec mode set may be set for a channel performance upper limit. In addition, it may also be specified that, when the channel performance is lower than a predetermined threshold, no communication service is allowed. A class of the codec mode set is determined by each parameter forming the codec mode set. For voice codec schemes, classes of AMR. AMR-W B and EVS are in an ascending order. For voice data transmission rates, classes of 4.75 kbps, 5.15 kbps, 5.9 kbps, 6.7 kbps, 7.4 kbps, 7.95 kbps, 10.2 kbps and 12.2 kbps are in an ascending order. For frame aggregation, classes are gradually increased along with increase of the number of aggregated frames.

An index value may be set for each codec mode set to identify the class of the codec mode set. A mapping relationship between the index value and the class of the codec mode set may be predefined by a protocol or defined by the network. In an embodiment, index values 0, 1 and 2 are set for three codec mode classes of the voice codec schemes AMR, AMR-WB and EVS according to a predefinition in the protocol respectively, and if die index value is higher, the class of the codec mode set is higher. The protocol may be the access-layer protocol of the calling UE and may also be an application-layer protocol of the calling UE. In another embodiment, the network sets index values 0, 1 and 2 for the three codec mode classes of the voice codec schemes EVS, AMR-WB and AMR respectively, and it is set that the class of the codec mode set is higher if the index value is lower. The network may send this configuration to the calling UE through the broadcast channel.

In S330, the calling UE determines a codec mode set related to a type of a service based on information about the type of the service. For example, the codec mode set related to the type of the service is determined according to a type of a service to be transmitted (a voice, data and a video). S330 is executed by the application-layer protocol of the calling UE.

In S340, whether the codec mode set related to the type of the service is consistent with the codec mode set related to the current state of the network or not is determine to generate the proper codec mode set.

In an embodiment, the access layer of the calling UE reports the codec mode set determined according to S320 and related to the current state of the network to the application layer of the calling UE. When the calling UE is intended to initiate the service request, the calling UE may select a codec mode set from a shared codec mode set of the codec mode set related to the current state of the network and the codec mode set related to the type of the service as the proper codec mode set according to the application-layer protocol of the calling UE. For example, the codec mode set related to the current state of the network only allows the AMR voice codec scheme and the voice data transmission rate may be 4.75 kbps, 5.15 kbps and 5.9 kbps; while the codec mode set related to the type of the service allows the three voice codec schemes AMR, AMR-WB and EVS, and for the AMR voice codec scheme, the voice data transmission rate may be 4.75 kbps, 5.15 kbps, 5.9 kbps, 6.7 kbps and 7.4 kbps; and then the calling UE may select a codec mode set from the shared codec mode set (i.e., the AMR voice codec scheme, the voice data transmission rate may be 4.75 kbps, 5.15 kbps and 5.9 kbps) as the proper codec mode set. The calling UE may select any one of the shared codec mode set as the proper codec mode set and may also select one of the shared codec mode set as the proper codec mode set based on a predetermined rule (for example, a smallest channel bandwidth is occupied). If the codec mode set related to the current state of the network and the codec mode set related to the type of the service have no shared codec mode set, the application layer of the calling UE is required to redetermine the codec mode set related to the type of the service. In other words, the codec mode set determined by the application layer of the calling UE and related to the type of the service should be lower than (or not higher than) the codec mode set determined by the access layer of the calling UE and related to the current state of the network. For example, if the voice codec scheme in the codec mode set related to the type of the service is EVS and the voice codec scheme in the codec mode set related to the current state of the network is AMR-WB, the application layer of the calling UE is required to regulate the voice code manner in the codec mode set related to the type of the service into AMR or AMR-WB.

In another embodiment, when the calling UE is intended to initiate the service request, the application layer of the calling UE notifies the codec mode set determined according to S330 and related to the type of the service to the access layer of the calling UE. If the codec mode set related to the type of the service is not higher than the codec mode set determined by the calling UE according to S320 and related to the current state of the network, the codec mode set related to the type of the service may be determined as the proper codec mode set for service communication. Otherwise, the calling UE sends a notification message from the access layer to the application layer to enable the application layer to reselect the codec mode set related to the type of the service.

Similar to the embodiment illustrated in FIG. 2, the calling UE initiates the service request to the called UE by means of the first SDP message and provides the expected media type and the determined proper codec mode set (S350). The called UE notifies its supported media type and codec mode set by means of the first SOP response (S360).

In S370, the calling UE provides the media type and codec mode set determined by negotiation of the two parties by means of the second SDP. The called UE confirms the media type and codec mode set determined by negotiation of the two parties by means of the second SDP (S380). If the called UE confirms the proper codec mode set through the negotiation process, the calling UE and the called UE may perform service communication by means of the proper codec mode set.

Figure 4:
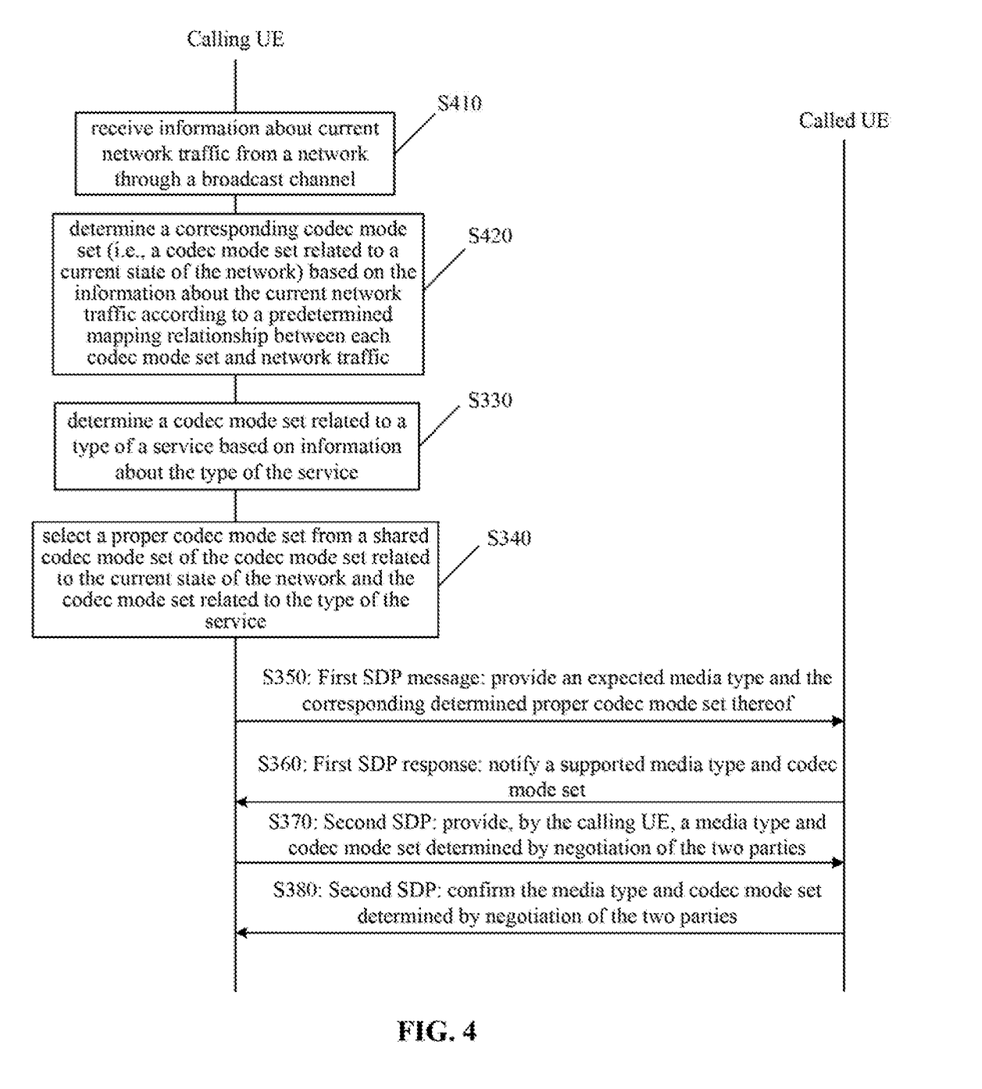
FIG. 4 illustrates a schematic diagram of a session creation process according to another embodiment of the disclosure.

In order to learn about the current state of the network, besides obtaining the current channel performance by detection, in another embodiment illustrated in FIG. 4, the calling UE receives information about current network traffic from the network through the broadcast channel (S410). In S420, the calling UE determines the corresponding codec mode set (i.e., the codec mode set related to the current state of the network) based on the information about the current network traffic according to a predetermined mapping relationship between codec mode sets and network traffics. The codec mode set related to the current state of the network may include multiple codec mode sets. S420 is executed by the access-layer protocol of the calling UE. The predetermined mapping relationship (for example, a mapping table) between codec mode sets and network traffics may be pre-stored in the calling UE.

If the calling UE has user access classes, when the codec mode set related to the current state of the network is determined in S320 or S420, reference may also be made to a current user access class of the calling UE. In an embodiment, the calling UE reads its current user access class. A corresponding codec mode set is determined based on the current user access class according to a predetermined mapping relationship between codec mode sets and user access classes. In an embodiment, for each access class, a mapping table about a predetermined mapping relationship between codec mode sets and channel performances may be provided. In another embodiment, for each access class, a predetermined mapping relationship between codec mode sets and network traffics may be provided. The predetermined mapping relationship (for example, a mapping table) between codec mode sets and the user access classes may be pre-stored in the calling UE. The operation of determining the corresponding codec mode set for the current user access class may also be executed by the access-layer protocol of the calling UE.

If the calling UE has user priorities, reference may also be made to a current user priority of the calling UE. In another embodiment, the calling UE reads its current user priority. A corresponding codec mode set is determined based on the current user priority according to a predetermined mapping relationship between codec mode sets and user priorities. In an embodiment, for each priority, a mapping table about a predetermined mapping relationship between codec mode sets and channel performances may be provided. In another embodiment, for each priority, a predetermined mapping relationship between codec mode sets and network traffics may be provided. The predetermined mapping relationship (for example, a mapping table) between codec mode sets and user priorities may be pre-stored in the calling UE. The operation of determining the corresponding codec mode set for the current user priority may also be executed by the access-layer protocol of live calling UE.

In another embodiment, the calling UE not only considers the channel performance and the network traffic and but also combines the user access class and the user priority. The calling UE determines the codec mode set related to the current state of the network based on current channel performance, network traffic, user access class and user priority according to the corresponding codec mode set in each mapping table. The operation of determining the codec mode set related to the current state of the network may be executed by the access-layer protocol of the calling UE.

In each embodiment, a selection probability factor may also be configured for each codec mode set. In the embodiment illustrated in FIG. 2, for the AMR voice codec scheme, selection probability factors 50%, 50%, 50%, 40%, 40%, 40%. 25% and 25% may be configured for eight codec mode sets with the voice data transmission rates 4.75 kbps, 5.15 kbps, 5.9 kbps, 6.7 kbps, 7.4 kbps, 7.95 kbps, 10.2 kbps and 12.2 kbps respectively. In an embodiment, the eight codec mode sets are all candidate codec mode sets. For the eight candidate codec mode sets, the calling UE generates a probability value based on a random function. The selection probability factor of each of the candidate codec mode sets is compared with the probability value. Only the codec mode set of which the selection probability factor is consistent with the probability value (that is, the probability value <the selection probability factor) is selected. For example, if the probability value generated by the calling UE is 45%, the codec mode sets with the voice data transmission rates 4.75 kbps, 5.15 kbps and 5.9 kbps are selected. In another embodiment, for the eight candidate codec mode sets, the calling UE may generate eight corresponding probability values based on a random function respectively. The selection probability factor of each of the candidate codec mode sets is compared with the corresponding probability value one by one. The codec mode set of which the probability value is lower than the corresponding selection probability factor is selected. In another embodiment (as illustrated in FIG. 3), for each shared codec mode set, there is made such a hypothesis that the selection probability factor corresponding to the voice data transmission rate 4.75 kbps is configured to be 50%, the selection probability factor corresponding to 5.15 kbps is configured to be 30% and the selection probability factor corresponding to 5.9 kbps is configured to be 20%. The calling UE generates a probability value based on a random function. For example, if the probability value randomly generated by the calling UE is 25%, the two codec mode sets with the voice data transmission rates 4.75 kbps and 5.15 kbps may be obtained. In the embodiment about the user access class, selection probability factors 80%, 50%, 20% and 10% may be configured for a first user access class (highest priority), a second user access class, a third user access class and a fourth user access class (lowest priority) respectively. For the four user access classes, probability values randomly generated by the calling UE are 70%, 45%, 15% and 15% respectively. If the current user access class of the calling UE is the third, the corresponding selection probability factor is 20%. Since the probability value (15%) is lower than the selection probability factor (20%), the calling UE may access the network by means of the corresponding codec mode set. If the probability values generated by the calling UE for the four user access classes are 70%, 45%, 25% and 15% respectively, since the probability value (25%) is higher than the selection probability value (20%), the calling UE may not access the network by means of the corresponding codec mode set.

In addition, the selection probability value may also be a number range. For example, selection probability factors 20%-80%, 30%-60%, 30%-50% and 40%-50% may be configured for the first user access class (the highest priority), the second user access class, the third user access class and the fourth user access class (the lowest priority) respectively. If the probability value generated by the calling UE for a certain user access class is consistent with the selection probability factor (that is, the probability value falls within the number range of the selection probability factor), the codec mode set corresponding to the selection probability factor may be selected.

The operation of determining the corresponding codec mode set according to the probability factor may also be executed by the access-layer protocol of the calling UE.

Figure 5:
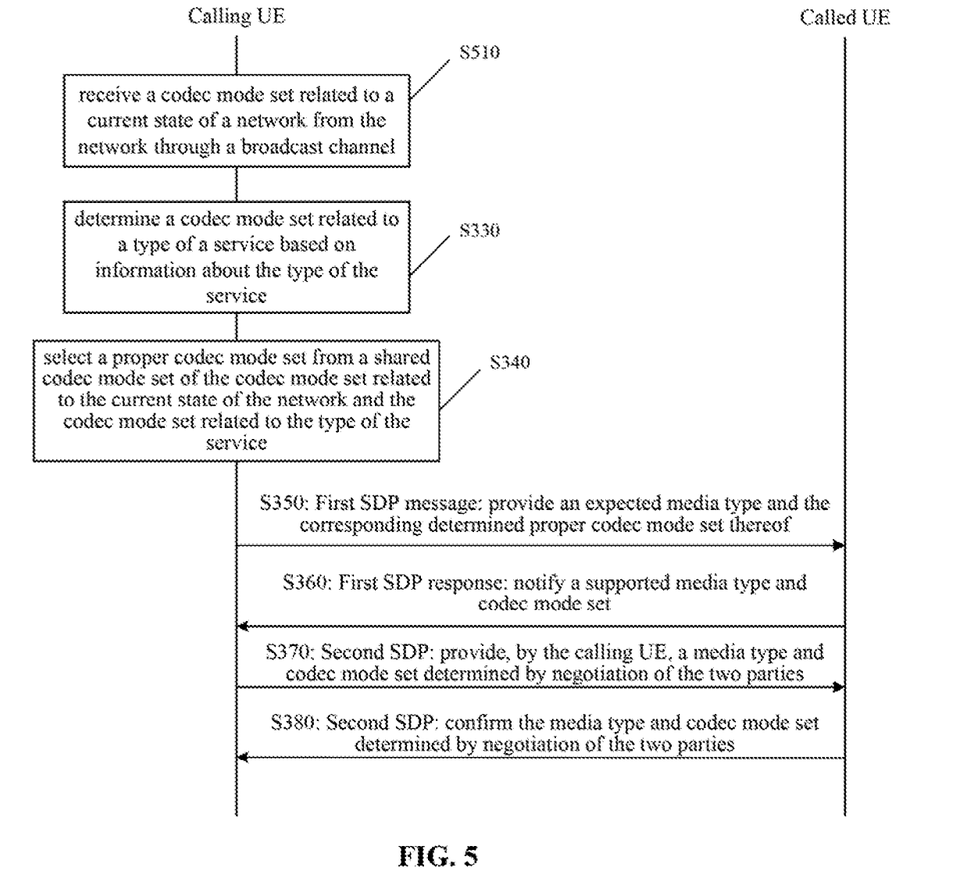
FIG. 5 illustrates a schematic diagram of a session creation process according to another embodiment of the disclosure.

In the embodiment illustrated in FIG. 4, the calling UE receives the information about the current network traffic from the network through the broadcast channel and determines the codec mode set related to the current state of the network based on the information about the current network traffic according to the predetermined mapping relationship between codec mode sets and network traffics. In an embodiment illustrated in FIG. 5, the calling UE receives the codec mode set related to the current state of the network from the network through the broadcast channel (S510), wherein the codec mode set is related to the network traffic. In an embodiment, network equipment may determine the codec mode set related to the current state of the network based on the current network traffic state according to the predetermined mapping relationship between codec mode sets and network traffics. When the network equipment sends the codec mode set related to the current state of the network through the broadcast channel, the calling UE receives the codec mode set representing the current state of the network. The codec mode set related to the current state of the network may include multiple codec mode sets. For example, when the network traffic is not high, for the AMR voice codec scheme, the voice data transmission rate may adopt any value of 4.75 kbps, 5.15 kbps, 5.9 kbps, 6.7 kbps, 7.4 kbps, 7.95 kbps, 10.2 kbps and 12.2 kbps. That is, the codec mode set related to the current state of the network includes eight codec mode sets. S510 may be executed by the access-layer protocol of the calling UE.

Figure 6:
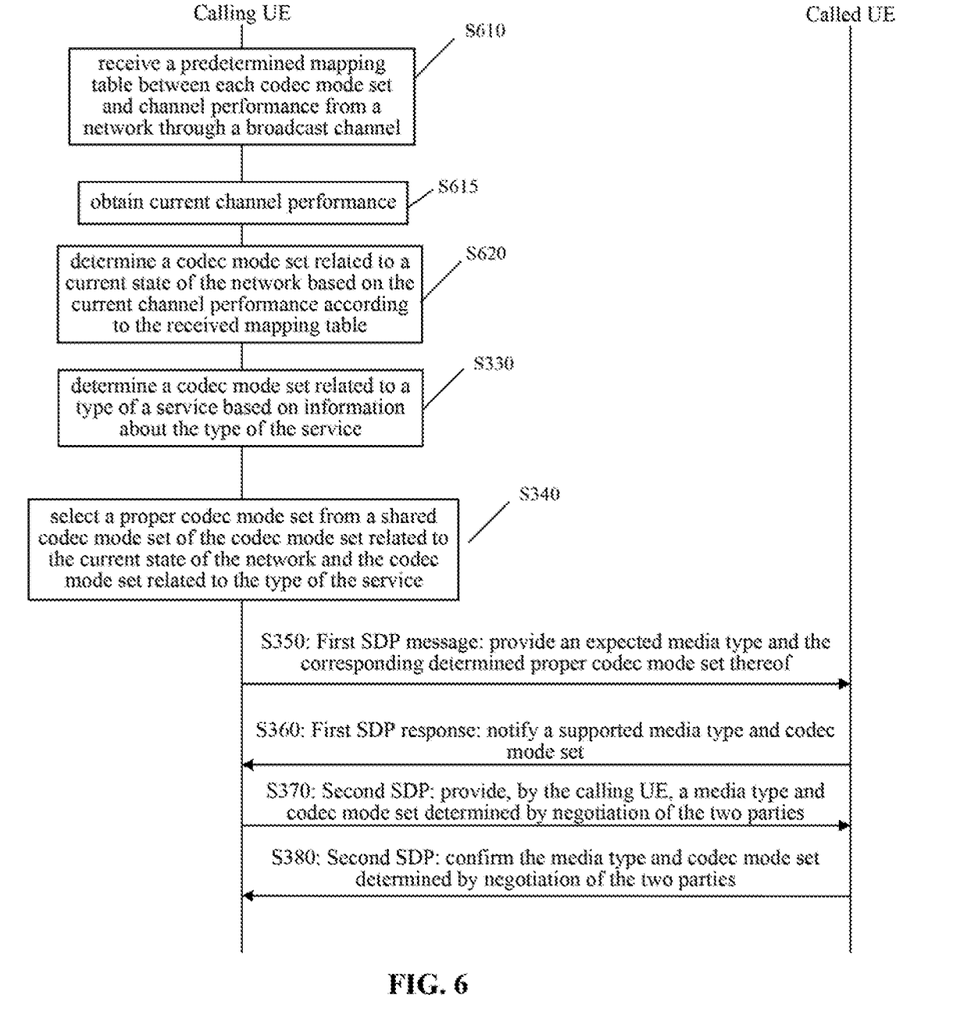
FIG. 6 illustrates a schematic diagram of a session creation process according to another embodiment of the disclosure.

In another embodiment, as illustrated in FIG. 6, the network equipment may send the predetermined mapping table, described in the embodiment illustrated in FIG. 3, between codec mode sets and channel performances through the broadcast channel. The calling UE receives the mapping table (S610). The calling UE obtains the current channel performance by detection (for example, channel estimation) (S615). The calling UE determines the codec mode set related to the current state of the network based on the current channel performance according to the received mapping table (S620), S610, S615 and S620 may be executed by the access-layer protocol of the calling UE.

Figure 7:
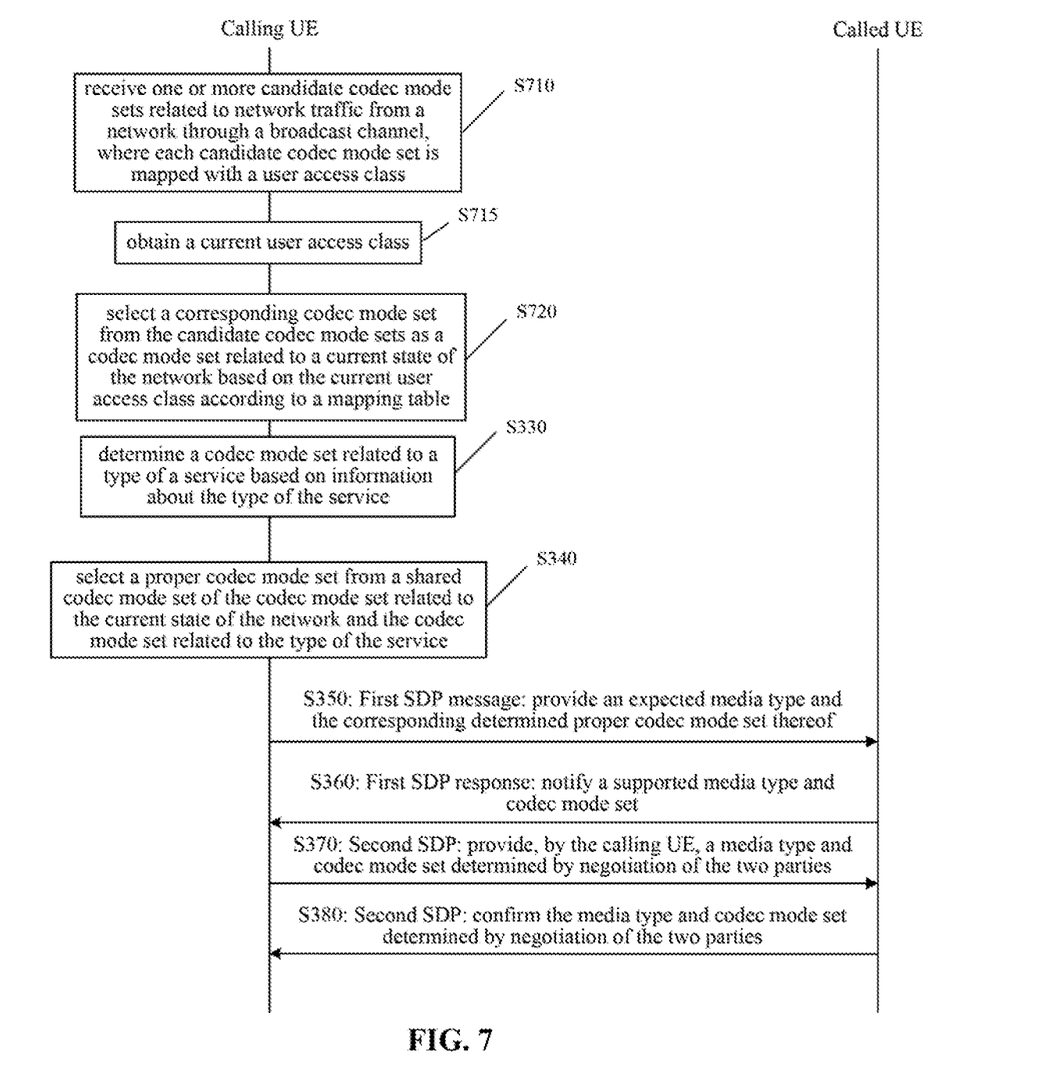
FIG. 7 illustrates a schematic diagram of a session creation process according to another embodiment of the disclosure.

In another embodiment, as illustrated in FIG. 7, the network equipment generates one or more candidate codec mode sets related to the network traffic based on the current network traffic condition, that is, each of the candidate codec mode sets indicates the current state of the network, wherein each of the candidate codec mode sets is mapped with a user access class. The network equipment sends a mapping table between a candidate codec mode set and a user access class through the broadcast channel. The calling UE receives the mapping table through the broadcast channel (S710). The calling UE obtains the current user access class (S715). The calling UE selects the corresponding codec mode set from the candidate codec mode sets as the codec mode set related to the current state of the network based on the current user access class according to the mapping table (S720). S710, S715 and S720 may be executed by the application-layer protocol of the calling UE.

Figure 8:
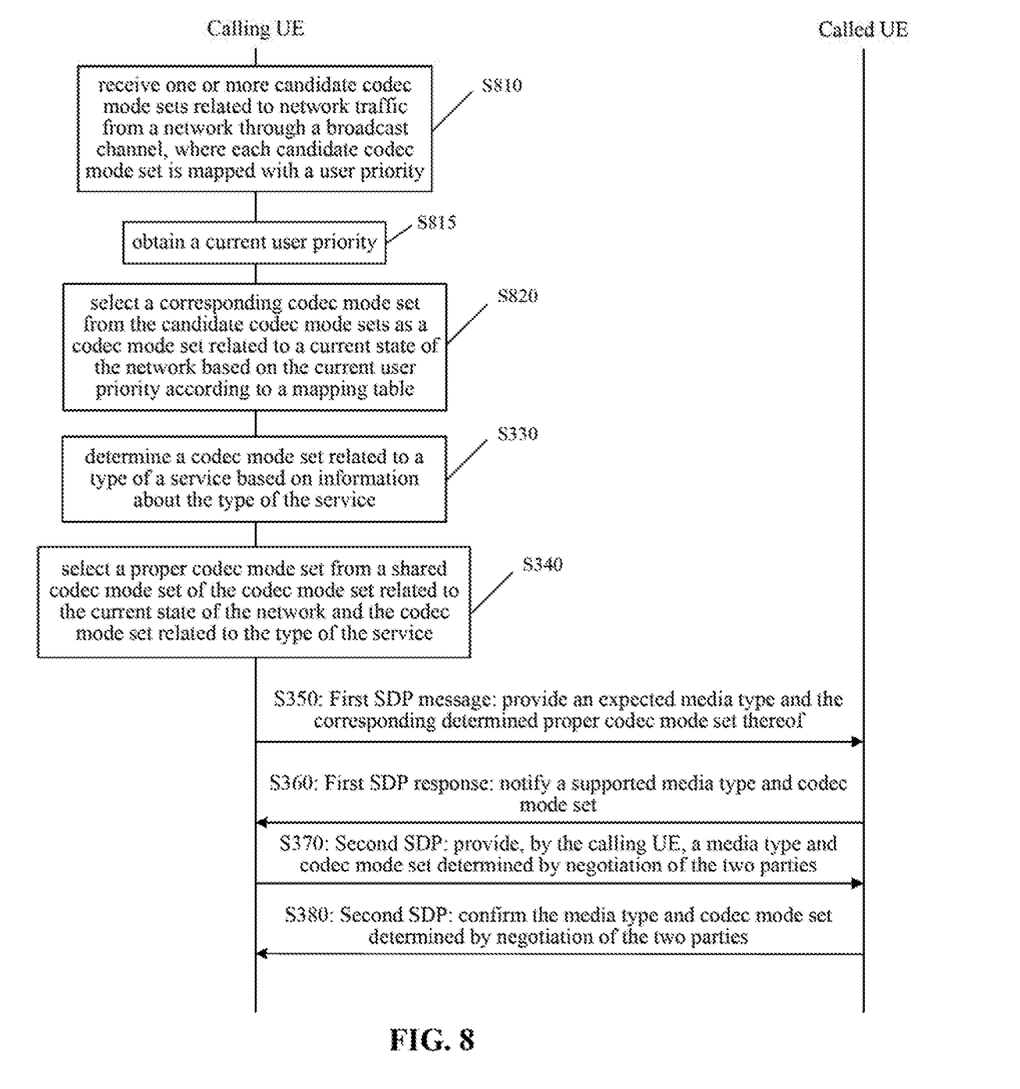
FIG. 8 illustrates a schematic diagram of a session creation process according to another embodiment of the disclosure.

In another embodiment, as illustrated in FIG. 8, the network equipment generates the one or more candidate codec mode sets related to the network traffic based on the current network traffic condition, that is, each of the candidate codec mode sets indicates the current state of the network, wherein each of the candidate codec mode sets is mapped with a user priority. The network equipment sends a mapping table between a candidate codec mode set and a user priority through the broadcast channel. The calling UE receives the mapping table through the broadcast channel (S810). The calling UE obtains the current user priority (S815). The calling UE selects the corresponding codec mode set from the candidate codec mode sets as the codec mode set related to the current state of the network based on the current user priority according to the mapping table (S820). S810, S815 and S820 may be executed by the access-layer protocol of the calling UE.

In the embodiments described in FIG. 2 to FIG. 8, the called UE may also determine the proper codec mode set by adopting the method steps similar to those adopted by the calling UE, thereby notifying the codec mode set supported by the called UE to the calling UE when the first SDP response is sent. The specific steps by which the called UE determines the proper codec mode set refer to each above-mentioned embodiment and will not be elaborated herein.

Although some specific embodiments of the disclosure are described in the application, those of ordinary skilled in the art may design transformations of the disclosure without departing from the concept of the disclosure.

In each abovementioned embodiment, for the steps executed by the access-layer protocol of the calling UE, the calling UE may also transmit corresponding parameters from the access layer to the application layer and the application-layer protocol of the calling UE executes the corresponding steps. For example, in S320 in the embodiment illustrated in FIG. 3, the calling UE may transmit detected information about the current channel performance to the application layer of the calling UE and the application-layer protocol of the calling UE determines the codec mode set related to the current state of the network based on the received information about the current channel performance according to the predetermined mapping relationship between codec mode sets and channel performances.

According to the method, described in combination with the drawings, for determining the codec mode set for service communication, the calling UE may negotiate about and dynamically regulate the codec mode set to be adopted by means of not only SIP signaling but also RTP/RTCP signaling.

The method, described in combination with the drawings, for determining the codec mode set for service communication is not only applied to a VoLTE network but also applied to another IMS-based network, for example, a Universal Mobile Telecommunications System (UMTS). In addition, the method for determining the codec mode set for service communication is also applied to a specific service of a Quality of Service (QoS) Class Identifier (QCI) service.

Some embodiments of the disclosure are described above in combination with the drawings in detail. These embodiments may be freely combined and all of the combinations fall within the scope originally recorded in the disclosure.

For example, term "determine", used in the application, include various actions. For example, "determine" may include calculation, operation, processing, deduction, survey, query (for example, query in a table, a database or another data structure), conclusion and the like. In addition, "determine" may further include reception (for example, reception of information), access (for example, access to data in a memory) and the like. Moreover, "determine" may further include solution, designation, selection, establishment and the like.

Information and signals may be represented by means of various technologies and methods. For example, data, instructions, commands, information, signals and the like mentioned throughout the above descriptions may be represented with voltages, currents, electromagnetic waves, magnetic fields or magnetic particles, light fields or light particles or any combinations thereof.

A universal processor, Digital Signal Processor (DSP), Application Specific Integrated Circuit (ASIC), Field Programmable Gate Array (FPGA) or another Programmable Logic Device (PLD), discrete gate or transistor unit, discrete hardware component or any combination thereof configured to realize the functions of the application may implement or execute various exemplary logical block diagrams, modules and circuits described in combination with the contents disclosed in the application. The universal processor may be a microprocessor or the processor may also be any commercially available processor, controller, microcontroller or state machine. The processor may also be implemented as a combination of computing equipment, for example, a combination of a DSP and a microprocessor, multiple microprocessors and a combination of one or more microprocessors and DSP kernels, or any other such structure.

The steps of the method or algorithm described in combination with the contents disclosed in the application may directly be embodied as hardware, software modules executed by the processor or a combination of the two. In an embodiment, a processor in calling UE executes a computer program (instruction) stored in a storage medium and may execute the steps in each embodiment to implement a method for determining a coding and decoding mode set for service communication. The software modules may be positioned in a storage medium in any form well-known in this field. Some exemplary available storage media include: a Random Access Memory (RAM), a Read-Only Memory (ROM), a Hash memory, an Electrically Programmable Read-Only Memory (EPROM), an Electrically Erasable Programmable Read-Only Memory (EEPROM), a register, a hard disk, a mobile disk, a Compact Disc Read-Only Memory (CD-ROM) and the like. The software module may include a single instruction or multiple instructions, and these instructions may be distributed on some different code segments, distributed in different programs and distributed in multiple storage media. The storage medium may be coupled to the processor, thereby enabling the processor to read information from the storage medium and write information into the storage medium. Or, the storage medium may also be a component of the processor.

The method disclosed in the application includes one or more steps or actions implementing the method. These steps or actions of the method may be exchanged without departing from the scope of protection of the disclosure. In other words, the sequence and/or use of specific steps or actions may be modified without departing from the scope of protection of the disclosure, unless the steps or actions are specified to be executed in a specific sequence.

The functions of the application may be realized by means of hardware, software, firmware or any combination thereof. When being realized by means of the software, these functions may be stored in a computer-readable storage medium as one or more instructions. The storage medium may be any available medium accessible for a computer. In an exemplary but unlimitedly manner, the computer-readable medium may include a RAM, a ROM, an EEPROM, a CD-ROM or another optical disk, magnetic disk storage medium or other magnetic storage medium or any other medium configured to contain or store program codes in an expected instruction or data structure form and accessible for the computer. Disks and discs used in the application include a Compact Disc (CD), a laser disc, an optical disk, a Digital Video Disk (DVD), a floppy disk and a Blue-ray® disk, wherein the disks usually magnetically copy data, while the discs optically copy data with laser.

In addition, the software or the instructions may also be transmitted on a transmission medium. For example, if the software is transmitted from a website, a server or another remote source by means of a coaxial cable, an optical liber cable, a twisted pair, a Digital Subscriber Line (DSL) or a wireless technology such as infrared, wireless and microwave technologies, the coaxial cable, the optical liber cable, the twisted pair, the DSL or the wireless technology such as the infrared, wireless and microwave technologies are included in the definition about the transmission medium.

Moreover, it should be understood that modules or other proper manners configured to execute the method and technology of the application may be downloaded or obtained according to a requirement through at least one of a user terminal or a base station. For example, such equipment may be coupled to the server to facilitate implementation of the modules executing the method of the application. Or, various methods of the application may be provided through a storage module (for example, a RAM, a ROM and a physical storage medium like a CD or a floppy disk), so that at least one of the user terminal or the base station may obtain various methods when the storage module is coupled to or provided for the equipment. In addition, any other proper technology providing the method and technology of the application for the equipment may further be used.

It should be understood that the disclosure is not limited to exact configurations and components shown above. Various modifications, transformations and variations may be made to the above arrangement, operations and details of the method and the device without departing from the scope of protection of the disclosure.

The disclosure is not limited to these disclosed embodiments and other solutions deduced therefrom by those skilled in the art also fall within the scope of protection of the disclosure. Therefore, the scope of protection of the disclosure shall be defined by the appended claims.

It is important to note that term "include" in the claims does not exclude existence of a component, unit or device which is not listed in the claims or the specification. Term "a/an" or "one" before the component, the unit or the device does not exclude existence of multiple such components, units or devices. In the device claims where multiple units are listed, some of these units may be implemented by means of the same type of at least one of software or hardware.

The invention claimed is:

1. A communication method, comprising:
   obtaining information about a current state of a network, wherein the current state of the network comprises a channel performance;
   determining a proper codec mode set based on the information about the current state of the network and information about a type of a service; and
   performing service communication by means of the proper codec mode set,
   wherein obtaining the information about the current state of the network comprises: obtaining one or more codec mode sets related to the current state of the network,
   wherein determining the proper codec mode set comprises:
   determining one or more codec mode sets related to the type of the service based on the information about the type of the service, wherein the codec mode set comprises at least one of: a voice data transmission rate and a video data transmission rate, wherein the type of the service comprises at least one of a voice and a video; and
   determining whether the codec mode set related to the type of the service is consistent with a codec mode set related to the current state of the network, to generate the proper codec mode set,
   wherein a class of the codec mode set related to the type of the service is not higher than a class of the codec mode set related to the current state of the network.

2. The method according to claim 1, wherein the current state of the network further comprises a network traffic.

3. The method according to claim 2, further comprising:
   obtaining at least one of a current user access class or a current user priority; and
   determining the proper codec mode set according to at least one of the current user access class or the current user priority.

4. The method according to claim 1, wherein obtaining one or more codec mode sets related to the current state of the network comprises:
   receiving a codec mode set related to the current state of the network from the network through a broadcast channel, wherein the codec mode set is related to the network traffic.

5. The method according to claim 1, wherein obtaining one or more codec mode sets related to the current state of the network comprises:

receiving one or more candidate codec mode sets related to the network traffic from the network through the broadcast channel, wherein each of the candidate codec mode sets is mapped with a user access class;

obtaining a current user access class; and selecting, according to the current access class, a corresponding codec mode set from the candidate codec mode sets as the codec mode set related to the current state of the network.

6. The method according to claim 1, wherein obtaining one or more codec mode sets related to the current state of the network comprises:

receiving one or more candidate codec mode sets related to the network traffic from the network through a broadcast channel, wherein each of the candidate codec mode sets is mapped with a user priority;

obtaining a current user priority; and selecting, according to the current user priority, a corresponding codec mode set from the candidate codec mode sets as the codec mode set related to the current state of the network.

7. The method according to claim 1, wherein obtaining one or more codec mode sets related to the current state of the network comprises:

obtaining a current channel performance; and determining a codec mode set related to the current state of the network based on the current channel performance according to a predetermined mapping relationship between codec mode sets and channel performances.

8. The method according to claim 7, wherein the predetermined mapping relationship between codec mode sets and channel performances is received through the broadcast channel.

9. The method according to claim 7, wherein the mapping relationship between codec mode sets and channel performances comprises at least one of the following conditions:

a codec mode set is mapped with a channel performance range;

a codec mode set is mapped with a channel performance lower limit;

a channel performance range is mapped with a highest codec mode set;

a channel performance upper limit is mapped with the highest codec mode set; or when the channel performance is lower than a predetermined threshold, no communication service is allowed.

10. The method according to claim 1, wherein obtaining one or more codec mode sets related to the current state of the network comprises:

receiving information about a current network traffic from the network through a broadcast channel; and determining a codec mode set related to the current state of the network based on the information about the current network traffic according to a predetermined mapping relationship between codec mode sets and network traffics.

11. The method according to claim 7, wherein obtaining one or more codec mode sets related to the current state of the network comprises:

obtaining a current user access class; and determining a codec mode set related to the current state of the network based on the current user access class according to a predetermined mapping relationship between codec mode sets and user access classes.

12. The method according to claim 7, wherein obtaining one or more codec mode sets related to the current state of the network comprises:

obtaining a current user priority; and determining a codec mode set related to the current state of the network based on the current user priority according to a predetermined mapping relationship between codec mode sets and user priorities.

13. The method according to claim 1, wherein the obtained codec mode set related to the current state of the network is further configured with a corresponding selection probability factor, and the method further comprises:

generating a probability value randomly; and when the probability value is consistent with the selection probability factor, obtaining the proper codec mode set.

14. The method according to claim 1, wherein the codec mode set further comprises at least one of: a voice codec scheme, frame aggregation, information about redundancy, a bandwidth or an image size.

15. The method according to claim 14, wherein the voice codec scheme is any one of Adaptive Multi Rate (AMR), Adaptive Multi-rate-Wideband (AMR-WB) and Enhanced Voice Service (EVS).

16. The method according to claim 9, wherein the class of the codec mode set comprises the following conditions:

for the voice codec scheme, classes of Adaptive Multi Rate (AMR), Adaptive Multi-rate-Wideband (AMR-WB) and Enhanced Voice Service (EVS) are in an ascending order;

for the voice data transmission rate, classes of 4.75 kbps, 5.15 kbps, 5.9 kbps, 6.7 kbps, 7.4 kbps, 7.95 kbps, 10.2 kbps and 12.2 kbps are in an ascending order; and for frame aggregation, classes are gradually increased along with increase of a number of aggregated frames.

17. A communication device, comprising:

a memory; and a processor, configured to execute an instruction stored in the memory to cause the communication device to execute a communication method, the method comprising:

obtaining information about a current state of a network, wherein the current state of the network comprises a channel performance;

determining a proper codec mode set based on the information about the current state of the network and information about a type of a service; and performing service communication by means of the proper codec mode set, wherein obtaining the information about the current state of the network comprises: obtaining one or more codec mode sets related to the current state of the network, wherein determining the proper codec mode set comprises:

determining one or more codec mode sets related to the type of the service based on the information about the type of the service, wherein the codec mode set comprises at least one of: a voice data transmission rate and a video data transmission rate, wherein the type of the service comprises at least one of a voice and a video; and determining whether the codec mode set related to the type of the service is consistent with a codec mode set related to the current state of the network, to generate the proper codec mode set, wherein a class of the codec mode set related to the type of the service is not higher than a class of the codec mode set related to the current state of the network.

18. A non-transitory computer-readable storage medium, storing a computer program thereon, which when the computer program is executed by a computer, causes the computer to carry out one or more actions, the one or more actions comprising:
- obtaining information about a current state of a network, wherein the current state of the network comprises a channel performance;
- determining a proper codec mode set based on the information about the current state of the network and information about a type of a service; and
- performing service communication by means of the proper codec mode set,
- wherein obtaining the information about the current state of the network comprises: obtaining one or more codec mode sets related to the current state of the network,
- wherein determining the proper codec mode set comprises:
- determining one or more codec mode sets related to the type of the service based on the information about the type of the service, wherein the codec mode set comprises at least one of: a voice data transmission rate and a video data transmission rate, wherein the type of the service comprises at least one of a voice and a video; and
- determining whether the codec mode set related to the type of the service is consistent with a codec mode set related to the current state of the network, to generate the proper codec mode set,
- wherein a class of the codec mode set related to the type of the service is not higher than a class of the codec mode set related to the current state of the network.

* * * * *